United States Patent Office 3,550,034
Patented Dec. 22, 1970

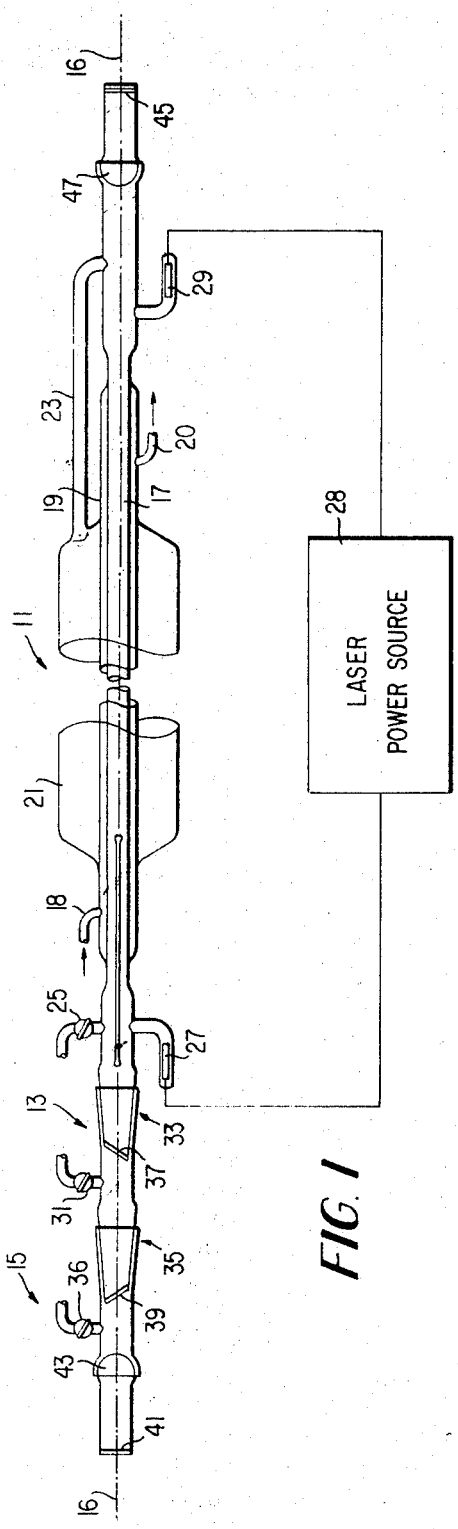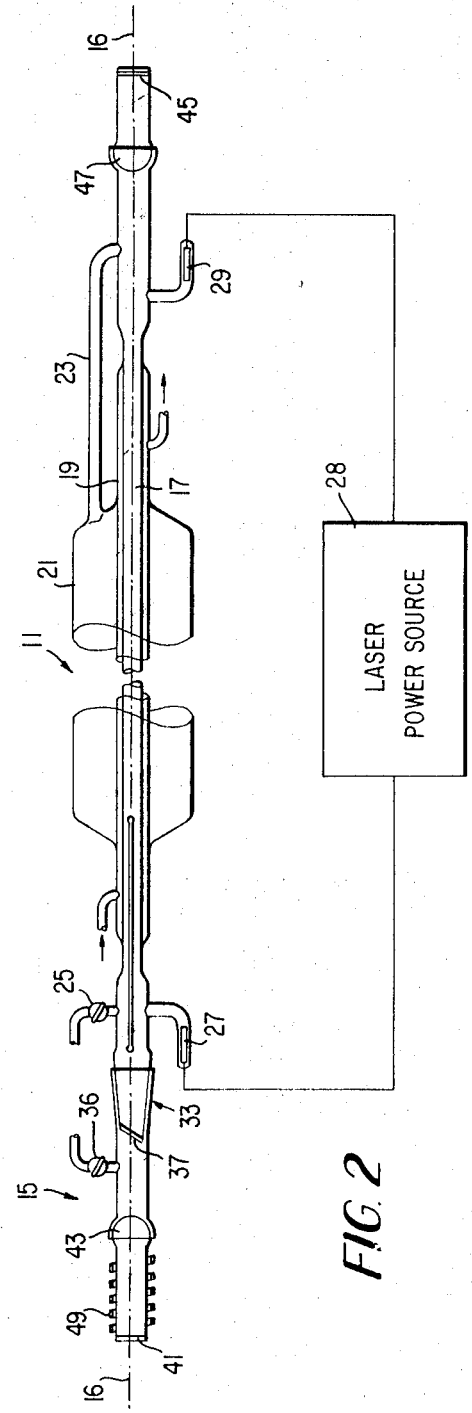

3,550,034
REPETITIVELY-PULSED, WAVELENGTH-
SELECTIVE LASER
Philip L. Hanst, Andover, Mass., assignor to the United
States of America as represented by the Administrator
of the National Aeronautics and Space Administration
Filed Feb. 20, 1969, Ser. No. 800,973
Int. Cl. H01s 3/00
U.S. Cl. 331—94.5                                13 Claims

ABSTRACT OF THE DISCLOSURE

This disclosure describes a laser with two gas absorption cells built into the laser cavity. The first of these cells contains a gas which controls the wavelength of emission and the second contains a gas which forces the laser into a high frequency pulsed mode of operation. Alternatively, a single gas absorption cell is used, the pulsing and wavelength shifting gases are mixed prior to insertion into the cell and the mixture is then heated to induce pulsing.

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

This invention relates to lasers, and more particularly, to a repetitively-pulsed, wavelength-selective laser.

The properties and uses of lasers (light amplification by the simulated emission of radiation), particularly $CO_2$ lasers, are becoming more and more apparent as the laser becomes more powerful and more stable. The high power of the $CO_2$ laser makes it useful for performing many jobs, such as cutting and welding jobs. The frequency stability of the $CO_2$ laser allows it to be used in communication applications as well as other scientific applications of measuring lengths and velocities. The ability of the $CO_2$ laser to project a narrow beam a long distance through the atmosphere leads to navigational applications and makes the laser attractive as an instrument for the measurement of atmospheric pollution.

One of the problems with prior art $CO_2$ lasers has been the difficulty in providing high-powered laser lines at a number of different wavelengths in the infrared spectrum. An additional problem has been the provision of an apparatus for repetitively pulsing any one of the chosen laser lines. Prior art $CO_2$ lasers have been pulsed by means of absorbing gases. The output from the laser has been shifted from one infrared line to another by use of prisms or gratings mounted within the laser cavity. It will be appreciated that such an apparatus is rather cumbersome and relatively ineffective in operation. More specifically, prior art methods of laser pulsing and wavelength control have the disadvantages that they are difficult to manipulate, require careful attention to keep them operating, and reduce the power output of the laser. For example, one prior art embodiment uses a diffraction grating to tune the laser through different wavelengths. This apparatus not only requires a delicate adjusting mechanism, but also costs a substantial part of the laser gain. Another prior art apparatus uses a sodium chloride prism to hold the laser to its normal 10.6 micron wavelength region and also uses a sample of sulfur hexafluoride gas to pulse the laser. A train of optical components allow the laser to be pulsed along a single laser line; however, reduced laser gain results from this apparatus.

Therefore, it is an object of this invention to provide a new and improved $CO_2$ laser.

It is also an object of this invention to provide a $CO_2$ laser that generates high-powered laser lines.

It is another object of this invention to provide a $CO_2$ laser that can be repetitively pulsed at any one of a number of chosen laser lines.

It is a further object of this invention to provide a $CO_2$ laser that generates high-power laser lines in the infrared spectrum wherein any chosen line can be repetitively pulsed.

SUMMARY OF THE INVENTION

In accordance with a principle of this invention, a new and improved $CO_2$ laser is provided. The laser comprises a conventional $CO_2$ laser structure including electrodes, a cavity, a reflecting mirror, an output mirror, and a power supply. In accordance with the invention, the laser cavity is modified to include gas absorption cell means adapted to contain a predetermined gas. The gas is adapted to select the wavelength of the laser and/or to repetitively pulse the laser.

In accordance with a further principle of this invention, the laser structure is formed of Pyrex glass and the gas absorption cell means comprises two gas cells mounted between the reflecting mirror and the normal laser cavity. One gas cell is adapted to contain a pulsing gas and the other is adapted to contain a wavelength selection gas.

In accoradnce with an alternative embodiment of the invention, the laser structure is formed of Pyrex glass and the gas absorption cell means includes a single cell mounted between the reflecting mirror and the normal laser cavity. The single cell is adapted to contain the pulsing gas and the wavelength selection gas, the two gases being mixed in the cell. In addition, the single cell is raised to a predetermined temperature by suitable means.

It will be appreciated from the foregoing description that the invention provides a new and improved $CO_2$ laser that can be repetitively pulsed at chosen laser lines. In essence, the invention provides for the modification of a conventional $CO_2$ laser by adding gas absorption cells or compartments that are aligned along the principal axis of the laser between the reflecting mirror of the laser and the laser cavity. The gas cells contain suitable gases which either repetitively pulse the laser or modify the laser's wavelength so as to produce laser lines of different wavelengths depending upon the gas used. For example, if propane gas is contained in the wavelength selection gas compartment, a wavelength of 10.2 microns is generated. Alternatively, by way of example, a small amount of propylene gas shifts the lasing line to 9.3 microns. Either of these lines can be pulsed by $CO_2$ gas contained in the other absorption cell. It will also be appreciated that, in addition to achieving the objects of the invention set forth above, the invention has the additional advantages of portability and sealed-off operation due to its being formed of Pyrex glass.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein:

FIG. 1 is a pictorial diagram of one embodiment of the invention; and,

FIG. 2 is a pictorial diagram of a second embodiment of the invention.

DESCRIPTION OF THE PREFERRED EMBODIMENTS

Turning now to the drawings wherein like reference numerals designate like parts throughout the several views, FIG. 1 illustrates one embodiment of the invention. The embodiment of the invention illustrated in FIG. 1 comprises basically three sections, 11, 13, and 15. The first section is the main body of the structure and is where laser action takes place. The first section consists of three concentric tubes 17, 19, and 21 located about a principal axis 16. The discharge and laser action take place in the inner tube 17. Preferably, a cooling liquid, such as water, flows between the inner tube 17 and the middle tube 19 from an inlet port 18 to an outlet port 20 The annular space between the middle tube 19 and the outer tube 21 is a gas reservoir which is connected to the discharge region of the structure by a tube 23 which permits a slow exchange of gas by diffusion and convection. In one actual embodiment of the invention, the total gas volume is about five liters. A first stopcock 25 is connected to the discharge region to allow mixtures of the operating gas to be inserted into the discharge region and gas reservoir. A suitable mixture of operating gas, for example, may consist of 5% $CO_2$, 10% $N_2$ and 85% He. The $CO_2$ is the infrared emitter. The nitrogen transfers energy from the discharge to the $CO_2$, and the helium remove energy from the $CO_2$. Other additive gases may be included, such as water, for the purpose of inhibiting the dissociation of $CO_2$ or xenon for the purpose of lowering the electron temperature in the discharge. Suitable electrodes 27 and 29 located at either end of the inner tube but axially offset therefrom are also illustrated in FIG. 1.

Located on the left side of FIG. 1 adjacent to the first section 11 and axially aligned therewith is the second section 13. The second section 13 is a gas cell or compartment for containing a wavelength selection gas of the type hereinafter described. A second stopcock 31 is connected to the second section 13 to allow the wavelength selection gas to enter the second section. The second section is attached to the first section 11 by a conventional tapered glass joint 33. Mounted adjacent the second section 13 and axially aligned thereto is the third section 15. The third section 15 forms a pulsing gas compartment or cell and includes a third stopcock 36 to allow a pulsing gas to flow into the compartment. The third section is connected to the second section 13 by a second conventional tapered glass joint 35. Attached to the left side (as viewed in FIG. 1) of the first section and closing the end thereof and attached to the left side of the second section and closing the end thereof are a pair of Brewster angled windows 37 and 39, respectively.

A flat, internally reflecting mirror 41 is attached to and encloses the left side of the third section 15. The third section 15 is split by a first spherical ground glass joint 43 to allow alignment of the overall laser structure in the manner hereinafter described. An apertured, internally reflecting output mirror 45 is attached to and encloses the right side of the first section 11. Further, the first section is broken by a second spherical ground glass joint 47 to allow alignment of the overall structure.

It will be appreciated from the foregoing description that the $CO_2$ laser of the invention is, structurally, uncomplicated and comprises a plurality of compartments for retaining suitable gases and cooling fluids. The structure is formed of a glass, such as Pyrex, making the overall structure portable and suitable for sealed-off operation. Suitable electrodes are mounted in the laser action part of the structure to create and maintain laser action.

Turning now to a brief description of the alignment of the laser, the flat mirror 41 and the output mirror 45 are aligned by moving the end pieces, located between the mirrors and their respective ground glass joints 43 and 47, into alignment. Preferably, the ground glass joints are ball-and-socket type joints. The laser is mounted on an optical bench and the end pieces are adjusted for maximum laser output by moving the end pieces in a vertical XY plane. Thereafter, if desired, the ends can be immobilized by covering the ball-and-socket joints with a suitable adhesive material such as the hard black "Apiezon-W" wax.

Turning now to a description of the operation of the laser, the wavelength of the emission of the laser is shifted across the 9 to 11 micron infrared region by inserting a suitable absorption gas into the wavelength selection compartment (the second section 13) of the previously described structure. Different organic vapors are used to produce different wavelengths. For example, a small amount of propylene gas shifts the $CO_2$ lasing from the customary 10.6 micron wavelength to a 9.3 micron wavelength. Alternatively, propane gas shifts the frequency of emission to 10.2 microns. Other organic vapors such as methanol may also be used. The type of combination of vapors determines the exact wavelength of the output emission, hence, the foregoing vapors are merely examples and should not be considered as limitations on the organic vapors that can be used with the invention.

The normally steady energy output of the laser is converted to a rapid stream of high-power pulses by the inclusion of a second gas sample compartment or cell formed by the third section 15 of the structure illustrated in FIG. 1. The second absorption gas turns the laser on and off some 50,000 times per second, the on time one microsecond and the off time being about 20 microseconds. The total power emitted in the pulsed mode of operation is roughly the same as in the steady mode of operation, hence, the intensity of the emitted radiation during a pulse is about 20 times greater than normal. The pulsating gas may take on various forms, such as formic acid, sulfur hexafluoride, boron trichloride or vinyl chloride.

Minor changes in the described inventive structure may occur as determined by the application of the invention. For example, for a high-power output, it is desirable that the output mirror be about 50% reflecting and 50% transmitting. Or, if the laser emission is to be controlled by means of absorbing gases, it is desirable to have an "under-coupled" laser, i.e., a laser which maintains a high-energy density within the cavity. More specifically, the laser must pass the photons through the absorbing gas a number of times before they are allowed to escape from the cavity. Also, the absorption cells might be placed at each end of the laser structure. This has advantages in both ease of fabrication and in protection of the output mirror from interaction with the charged particles of the discharge. The electrodes 27 and 29 can be any of several types. For example, in one actual embodiment of the invention, ordinary neon-sign electrodes were used. Alternatively, platinum electrodes may be used. Power supplied through the electrodes from a power supply 28 may come from a neon-type sign transformer (e.g., 12,000 v., 60 Hz. AC) or from any standard high-voltage DC power supply with a ballast resistor.

FIG. 2 illustrates a slightly modified embodiment of the invention; specifically, the second section 13 is eliminated. In addition, a heating tape illustrated by the coil 49 surrounds the third section 15. Other than these modifications, the structure illustrated in FIG. 2 is substantially identical to the structure illustrated in FIG. 1. Hence, the structure will not be further specifically described.

The only substantial difference between the operation of the embodiment of the invention illustrated in FIG. 2 and the operation of the embodiment of the invention illustrated in FIG. 1 is that the gases must be heated during operation. Further, for the $CO_2$ laser, the pulsing gas must be $CO_2$ and the wavelength shifting gas is preferably propylene. These gases are mixed together in the single compartment. The mixed gases are raised to a temperature of about 150° C. by any suitable means, such as the heating tape 49, for example. The wavelength of the pulsed output is determined by the relative porportions of propylene and $CO_2$. Also, it should be understood that heated $N_2O$ gas would likewise be an effective pulsing agent for an $N_2O$ molecular laser.

Turning now to a description of the theoretical cause of the repetitive pulsing effect of an absorbing gas, as best understood: before the emission of a laser pulse can take place, a spontaneous and stimulated emission builds up in the laser cavity and is incident upon the pulse-creating absorbing gas. The gas does not absorb totally, but just enough so that lasing does not take place until bleaching sets in. The laser line most likely to produce bleaching is the line with the highest product of laser gain and absorption coefficient. The absorbing gas resists bleaching by collision energy transfer into the absorbing state as well as by radiative transistions from the excited state to ground. When laser radiation finally "breaks through," the absorber (or at least a single rotational line of the absorber) becomes transparent. Transparency is defined as the state where there is an equal population, the upper and lower vibration-rotation states of the absorber. Absorption and stimulated emissions are then equal. While the absorber is in the bleached state, the laser "dumps" its stored energy. The bleached gas then returns to its normal state and the process repeats. In this manner, pulsing is created.

The spacing of the pulses is a measure of the length of time necessary for the excitation to reach the lasing threshold in the presence of the absorber. The pulses come closer together as the discharge current is increased. They also come closer together as any other parameter is changed that makes bleaching easier. For example, increasing the energy density within the laser cavity by raising the reflectivity of the output mirror brings the pulses closer together. In addition, a high absorption coefficient, a long excited state lifetime, and a low pressure of absorbing gas will bring the pulses close together.

While the properties of the absorbing gas are related to pulse spacing, they are unrelated to pulse shape and width. When the bleaching threshold is reached, it appears that all absorbing molecules within the optical beam are raised to the excited state within a very short period of time, probably much shorter than a microsecond. When other molecules, not initially in the absorbing rotational level, are thrown in the absorbing state by having their rotational quantum number changed during collisions, they too are immediately bleached. The absorbing gas is thus kept in a state of transparency— an equal population of the absorbing and emitting state— for as long as the laser beam exists. Once bleaching sets in, the absorbing gas is about out of the picture until the laser depletes its excitation. Thus, as best can be observed experimentally, the pulse shape and width is substantially the same whether the pulsing gas is formic acid, vinyl chloride, $CO_2$, or propylene.

While pulse shape and width is generally the same regardless of the nature of the gas, the pulse shape and width is dictated by the properties of the lasing gas. During lasing, vibrationally excited $CO_2$ molecules within the optical beam can have their rotational quantum numbers changed by collisions and can be transferred from a non-lasing rotational state to a lasing state. They then contribute to laser emission. The length of time required to get all of the energy out of the manifold of rotational levels has been observed to be one to two microseconds. And, this experimental observation can be proven by mathematical calculations. In any event, this phenomenon dictates pulse shape and pulse width.

It will be appreciated from the foregoing description that the invention provides a rather uncomplicated apparatus for creating wavelength selective, pulsating $CO_2$ lasing. That is, the laser of the invention is repetitively pulsed at a predetermined wavelength. Pulsing is created by placing a pulsing gas in a compartment in a laser structure formed of Pyrex-type glass. The wavelength of the pulses is controlled by putting a suitable wavelength selection gas into a wavelength selection compartment. The pulse gas compartment and the wavelength selection gas compartment are axially aligned and form sections of the overal laser structure.

It will be appreciated by those skilled in the art and others that the herein described invention has various advantages over prior art lasers including prior art $CO_2$ lasers. For example, with a single laser, either pulsed or steady operation can be chosen at one of many different wavelengths merely by regulating the composition of partial pressures, or temperatures of certain absorbing gases. In addition, the high peak power of laser pulses is useful in creating non-linear optical effects in infrared transmissive materials. Further, repetitive pulsing of a laser is useful in probing the atmosphere or signalling through the atmosphere by permitting an easy discrimination of laser radiation from steady background thermal radiation. Moreover, wavelength control permits the matching of a laser line to the absorption bands of air pollutants. Hence, pollutants can be easily detected by the attenuation of a particular wavelength laser beam as it passes through the atmosphere. Other advantages of the invention will be apparent to those skilled in the art.

What is claimed is:

1. A repetitively-pulsed, wavelength-selective laser comprising:
    a molecular laser including power supply means and having a principal axis along which lasing action occurs to form a laser beam;
    a single gas compartment means forming a part of said molecular laser for holding a predetermined amount of absorbing gas vapor, said gas compartment means being mounted along said principal axis so that the laser beam passes through the absorbing gas being held in said gas compartment; and,
    heating means mounted about said single gas compartment for heating the absorbing gas vapor held in said compartment.

2. A repetitively-pulsed, wavelength-selective laser as defined in claim 1 wherein said molecular laser is a $CO_2$ laser, and said gas compartment means is filled with a $CO_2$ absorbing gas vapor.

3. A repetitively-pulsed, wavelength-selective laser as defined in claim 2 wherein said single gas compartment also contains a wavelength-selective absorbing gas vapor in addition to said $CO_2$ absorbing gas vapor.

4. A repetitively-pulsed, wavelength-selective laser as defined in claim 3 wherein said wavelength-selective absorbing gas vapor is propylene.

5. A repetitively-pulsed, wavelength-selective laser as defined in claim 4 which further includes means attached to the ends of said $CO_2$ laser along said principal axis for aligning said laser beam.

6. A repetitively-pulsed, wavelength-selective laser as defined in claim 5 wherein said single gas compartment and a portion of said laser are formed of Pyrex glass.

7. A repetitively-pulsed, wavelength-selective laser as defined in claim 1 wherein said molecular laser is a $N_2O$ laser and said single gas compartment is filled with $N_2O$ absorbing gas vapor.

8. A repetitively-pulsed, wavelength-selective laser comprising:
    a $CO_2$ laser including power supply means and having a principal axis along which lasing action occurs to form a laser beam;
    a first gas compartment filled with a pulse-creating, absorbing gas vapor; and,
    a second gas compartment filled with a wavelength-selective, absorbing gas vapor, said first and second gas compartments both being mounted along said principal axis so that the laser beam passes through both the pulse-creating, absorbing gas vapor and the wavelength-selective, absorbing gas vapor.

9. A repetitively-pulsed, wavelength-selective laser as defined in claim 8 wherein the pulse-creating, absorbing gas vapor held in said first gas compartment is chosen from the group consisting of formic acid, sulfur hexafluoride, boron trichloride, and vinyl chloride.

10. A repetitively-pulsed, wavelength-selective laser as defined in claim 9 wherein the wavelength-selective, absorbing gas vapor held in second gas compartment is chosen from the group consisting of propylene, propane, and methanol.

11. A repetitively-pulsed, wavelength-selective laser as defined in claim 10 wherein said laser includes cooling means for allowing a cooling liquid to flow through a predetermined region of said laser.

12. A repetitively-pulsed, wavelength-selective laser as defined in claim 11 which further includes means attached to the ends of said laser along said principal axis for aligning said laser beam.

13. A repetitively-pulsed, wavelength-selective laser as defined in claim 12 wherein said gas compartment and a portion of said laser are formed of high melting point borosilicate glass.

References Cited

UNITED STATES PATENTS 3,504,982   4/1970   Robieux _____ 331—94.5

RONALD L. WIBERT, Primary Examiner

T. MAJOR, Assistant Examiner